US012589948B2

(12) United States Patent
Zanelli

(10) Patent No.: US 12,589,948 B2
(45) Date of Patent: Mar. 31, 2026

(54) APPARATUS FOR HANDLING PREFORMS

(71) Applicant: SACMI IMOLA S.C., Imola (IT)

(72) Inventor: Matteo Zanelli, Imola (IT)

(73) Assignee: SACMI IMOLA S.C., Imola (IT)

( * ) Notice: Subject to any disclaimer, the term of this patent is extended or adjusted under 35 U.S.C. 154(b) by 46 days.

(21) Appl. No.: 18/715,395

(22) PCT Filed: Dec. 1, 2022

(86) PCT No.: PCT/EP2022/084037
§ 371 (c)(1),
(2) Date: May 31, 2024

(87) PCT Pub. No.: WO2023/099656
PCT Pub. Date: Jun. 8, 2023

(65) Prior Publication Data
US 2025/0033895 A1 Jan. 30, 2025

(30) Foreign Application Priority Data

Dec. 2, 2021 (IT) ........................ 102021000030518

(51) Int. Cl.
B65G 47/06 (2006.01)
B29C 49/42 (2006.01)
(Continued)

(52) U.S. Cl.
CPC ........ B65G 47/06 (2013.01); B29C 49/42065 (2022.05); B29C 49/42101 (2022.05);
(Continued)

(58) Field of Classification Search
CPC ...... B65G 47/06; B65G 17/12; B65G 47/252; B65G 47/848; B29C 49/42065;
(Continued)

(56) References Cited

U.S. PATENT DOCUMENTS 4,009,776 A * 3/1977 Skrypek .............. B65G 47/848
198/487.1
4,929,450 A * 5/1990 Takakusaki ....... B29C 49/42073
425/526
(Continued)

FOREIGN PATENT DOCUMENTS

DE 29716268 U1 10/1998
EP 1112835 A2 * 7/2001 ....... B29C 49/42073
WO WO-2009068167 A2 * 6/2009 ........... B65G 47/252

OTHER PUBLICATIONS

International Search Report for Application No. PCT/EP2022/084037, dated Feb. 24, 2023, 3 pages.
Italian Search Report for Application No. 202100030518, dated Jun. 30, 2022, 8 pages.
Written Opinion for Application No. PCT/EP2022/084037, dated Feb. 24, 2023, 4 pages.

*Primary Examiner* — James R Bidwell
(74) *Attorney, Agent, or Firm* — CANTOR COLBURN LLP

(57) ABSTRACT

An apparatus for handling plastic preforms includes a feeding line for preforms that comprise a preform body and a preform mouth, a conditioning oven, a setdown device for the preforms being provided which is designed to feed the preforms to a transfer or blow-molding carousel, the conditioning oven being associated with a closed conveyance circuit which includes supporting elements to support respective preforms. The feeding line has a feeding device to feed the preforms to respective supporting elements; the setdown device has an overturning element adapted to pick up the preforms and to bring them to a pickup condition in which the respective mouths are directed upward. The setdown device further includes a pickup device to pick up the preforms in the pickup condition from the overturning element to feed them to the transfer or blow molding carousel.

12 Claims, 9 Drawing Sheets

(51) Int. Cl.

| | |
|---|---|
| *B29C 49/68* | (2006.01) |
| *B65G 17/12* | (2006.01) |
| *B65G 47/252* | (2006.01) |
| *B65G 47/84* | (2006.01) |

(52) U.S. Cl.
CPC .. *B29C 49/42115* (2022.05); *B29C 49/42117* (2022.05); *B29C 49/68* (2013.01); *B65G 17/12* (2013.01); *B65G 47/252* (2013.01); *B65G 47/848* (2013.01)

(58) Field of Classification Search
CPC ......... B29C 49/42101; B29C 49/42115; B29C 49/42117
See application file for complete search history.

(56) References Cited

U.S. PATENT DOCUMENTS

| | | | |
|---|---|---|---|
| 5,863,571 A | 1/1999 | Santais et al. | |
| 8,517,710 B2 * | 8/2013 | Duclos ............... | B29C 49/5602 425/150 |
| 2003/0168782 A1 | 9/2003 | Suzuki | |
| 2007/0286920 A1 | 12/2007 | Netsu | |
| 2018/0015657 A1 * | 1/2018 | Linke .................. | B65G 47/847 |
| 2023/0202821 A1 * | 6/2023 | Neubauer ......... | B29C 49/42085 53/426 |

\* cited by examiner

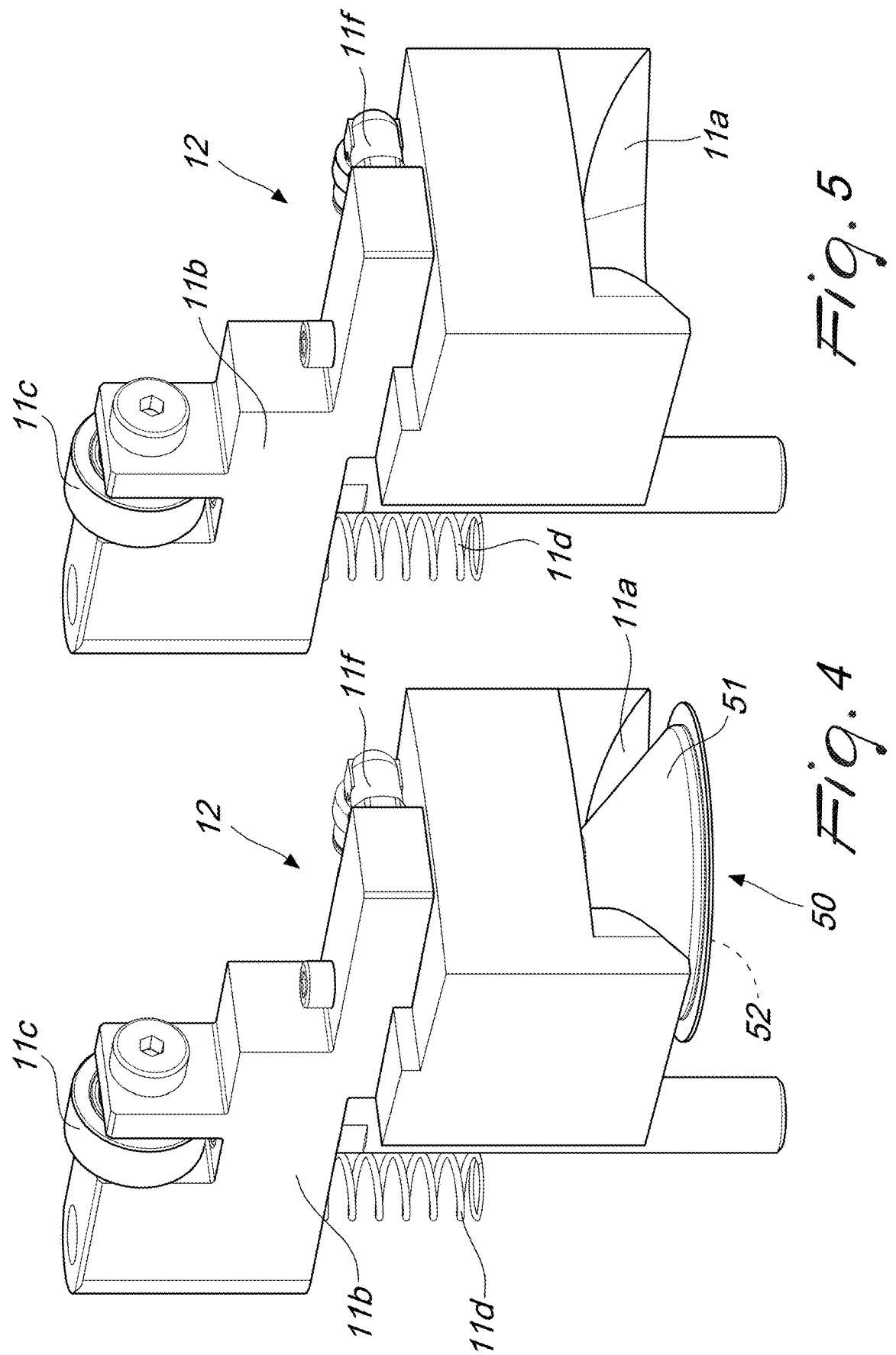

APPARATUS FOR HANDLING PREFORMS

CROSS-REFERENCE TO RELATED APPLICATIONS

This application is a 35 U.S.C. § 371 National Stage patent application of PCT/EP2022/084037, filed on 1 Dec. 2022, which claims the benefit of Italian patent application 102021000030518, filed on 2 Dec. 2021, the disclosures of which are incorporated herein by reference in their entirety.

TECHNICAL FIELD

The present disclosure relates to an apparatus for handling preforms.

BACKGROUND

Systems are known for blow molding plastic containers which comprise an apparatus for blow molding preforms so as to obtain containers, such as for example bottles.

The preforms are fed to the apparatus for blow molding the preforms by way of a conveyor associated with a thermal conditioning oven for the preforms.

The conveyor is normally associated with a device for transferring the preforms, which is constituted for example by a handling device, which picks up the preforms from the conveyor in order to transfer them to the apparatuses for blow molding.

The conveyor is likewise associated at its input point with an additional transfer device, which is designed to pick up the preforms from a feeding line in order to transfer them to the conveyor.

The transfer device, too, is normally constituted by a handling device that has clamps for gripping the preforms.

Conventional blow molding machines are known, for example, from any of DE 297 16 268 U1, US 2007/0286920 A1, and U.S. Pat. No. 5,863,571 A. Moreover, a blow molding apparatus is known, for example, from US 2003/0168782 A1.

The known solutions, although widely used, are not however devoid of drawbacks.

In particular, manipulation of the preforms, heated or to be heated, by the manipulator devices can present criticalities that, in some cases, can damage the preforms.

Furthermore, the use of clamping manipulator devices can present drawbacks if the preforms have mouths of considerable dimensions.

Furthermore, in the known solutions, it is necessary to use respective manipulator devices both upstream and downstream of the conditioning oven.

SUMMARY

The aim of the present disclosure is to provide an apparatus for handling preforms that is capable of improving the known art in one or more of the above mentioned aspects.

Within this aim, the disclosure makes available an apparatus for handling preforms that makes it possible to pick up and set down the preforms in an efficient and reliable manner, even if they have non-standardized shape structures.

the disclosure also provides an apparatus for handling preforms that is highly reliable, easy to implement and of low cost.

This aim and these and other advantages which will become more apparent hereinafter are achieved by providing an apparatus for handling preforms according to the independent claim, optionally provided with one or more of the characteristics of the dependent claims.

BRIEF DESCRIPTION OF THE DRAWINGS

Further characteristics and advantages of the disclosure will become better apparent from the description of some preferred, but not exclusive, embodiments of the apparatus for handling preforms according to the disclosure, which are illustrated for the purposes of non-limiting example in the accompanying drawings wherein:

FIG. 4 is a perspective view of a portion of the feeding device associated with a preform;

FIG. 5 is a perspective view of a portion of the feeding device, not associated with a preform;

DETAILED DESCRIPTION OF THE DRAWINGS

Figure 1:
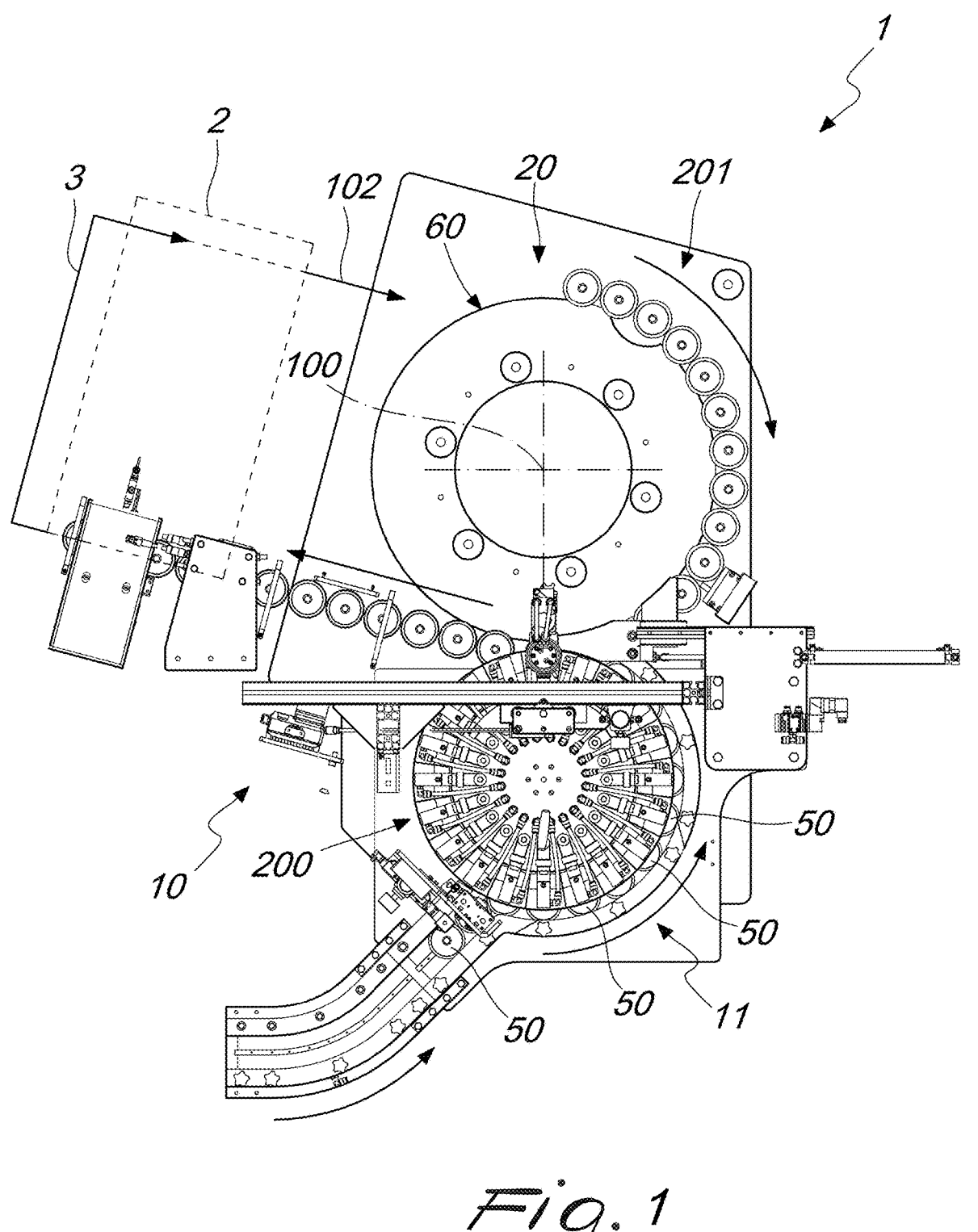
FIG. 1 is a schematic view from above of the apparatus according to the disclosure.
Figure 2:
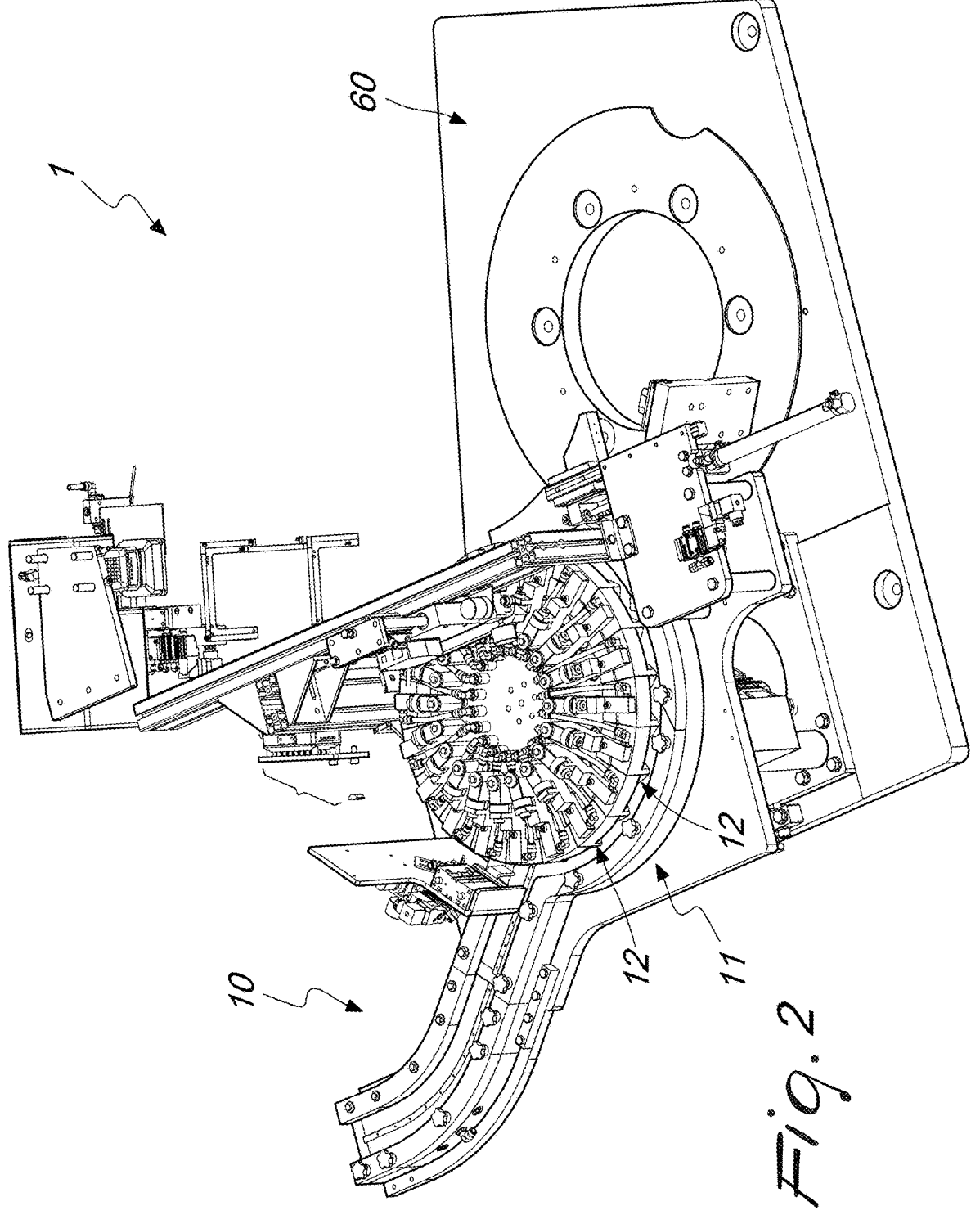
FIG. 2 is a perspective view of a portion of the apparatus according to the disclosure.
Figure 3:
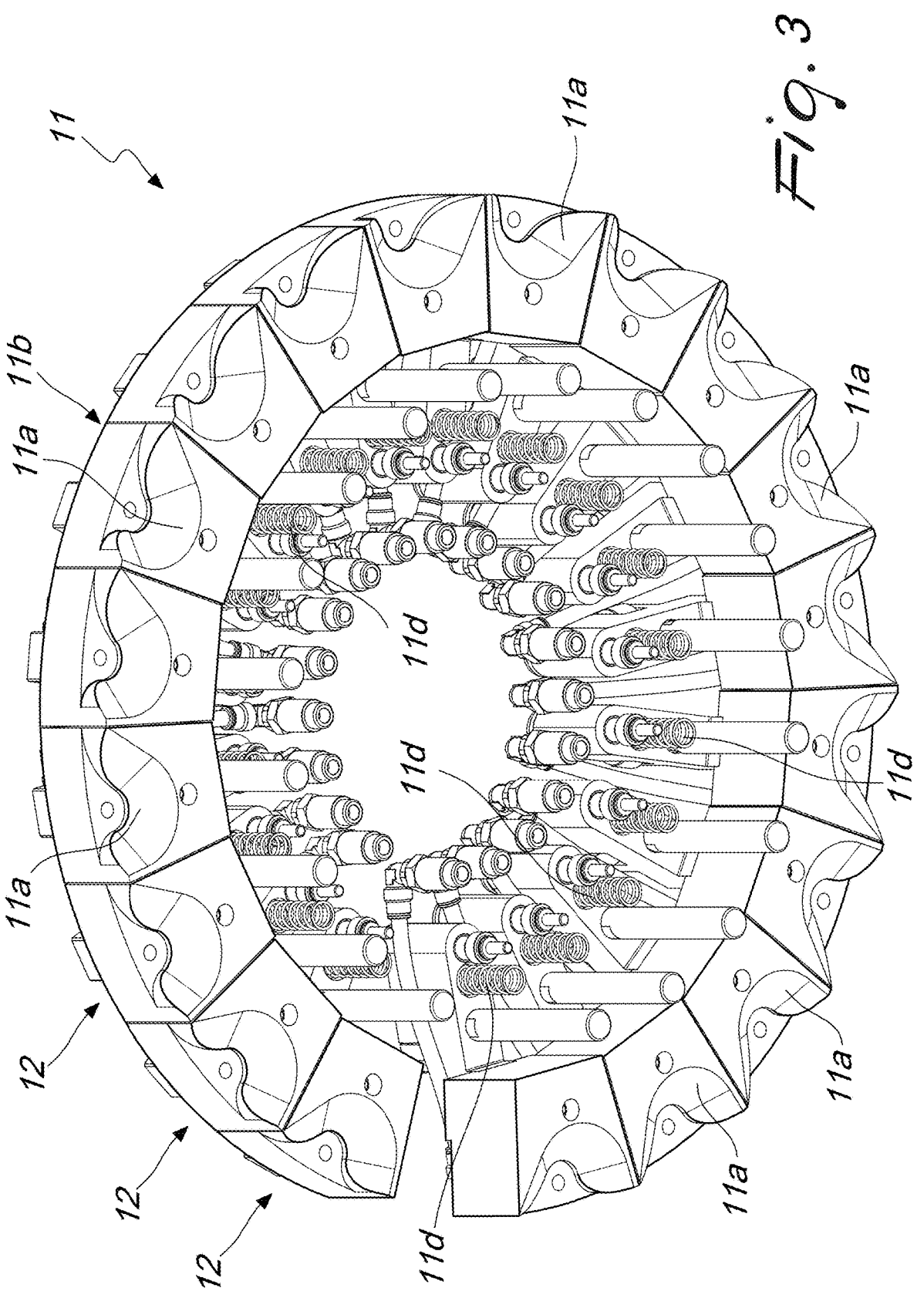
FIG. 3 is a perspective view from below of the feeding device.
Figures 6, 7:
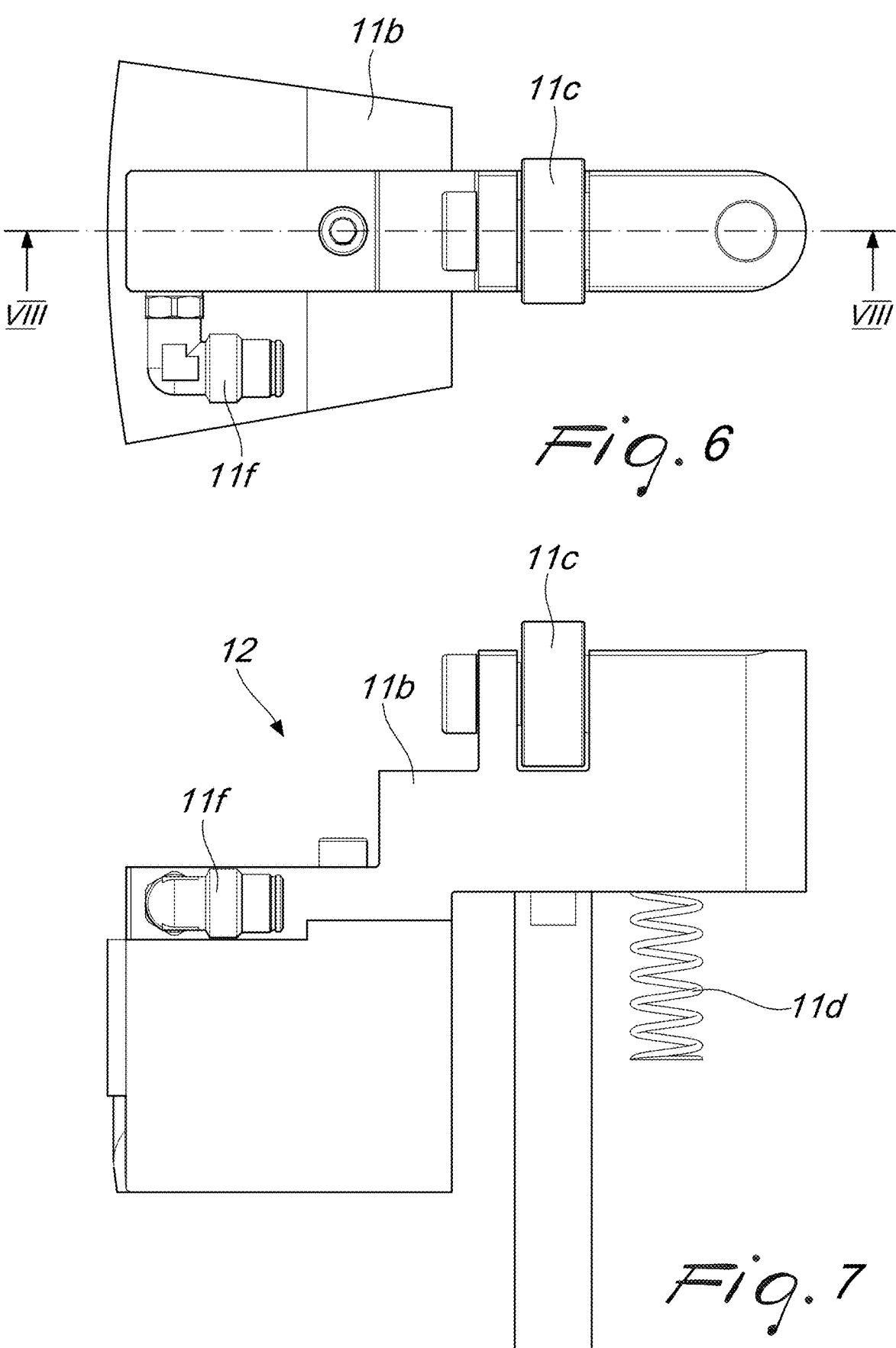
FIG. 6 is a view from above of the portion of the feeding device of FIG. 5.
FIG. 7 is a side view of the portion of the feeding device of FIG. 5.
Figure 8:
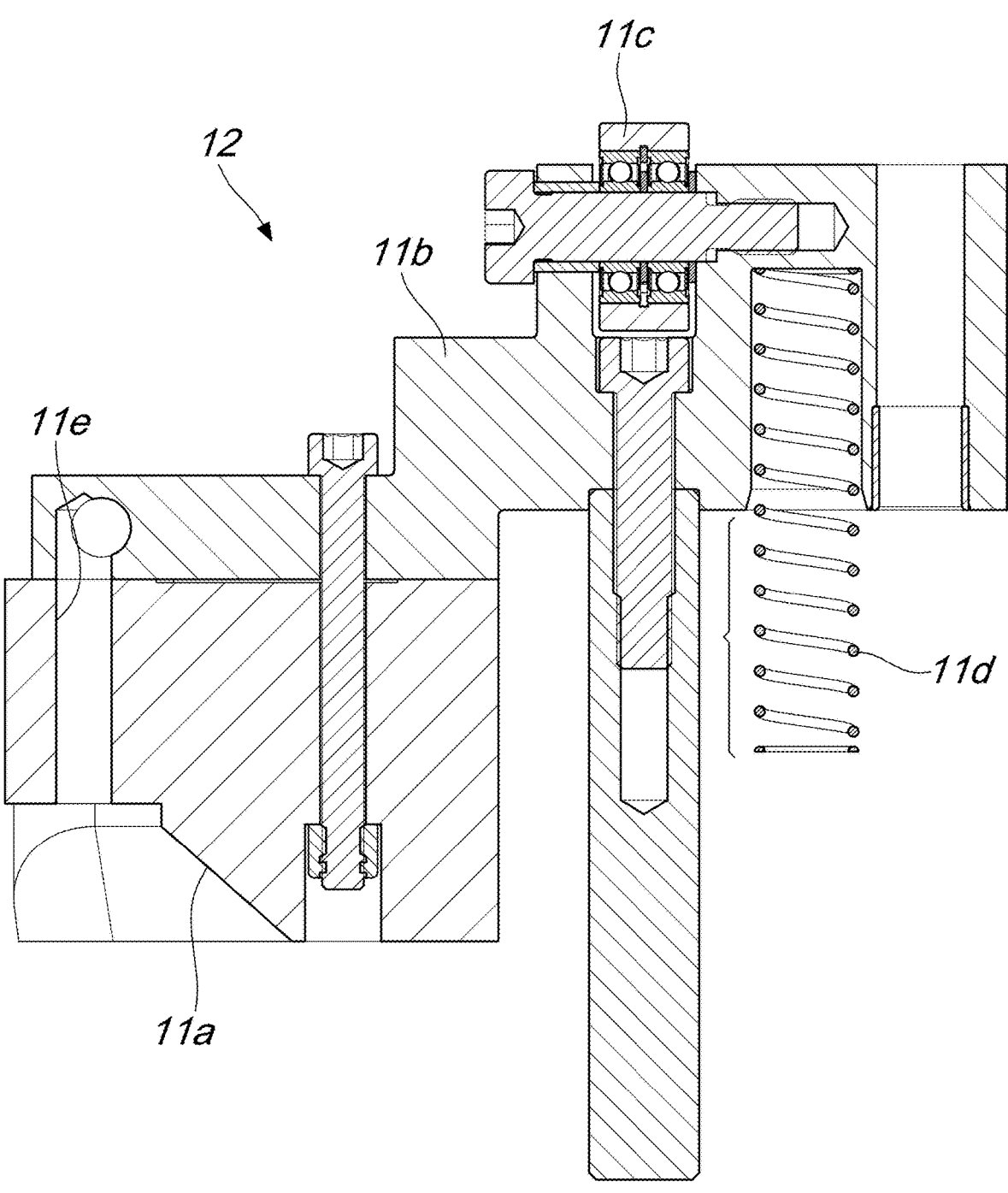
FIG. 8 is a cross-sectional view of the portion of the feeding device taken along the plane of arrangement identified by the line VIII-VIII in FIG. 6.
Figures 9, 10:
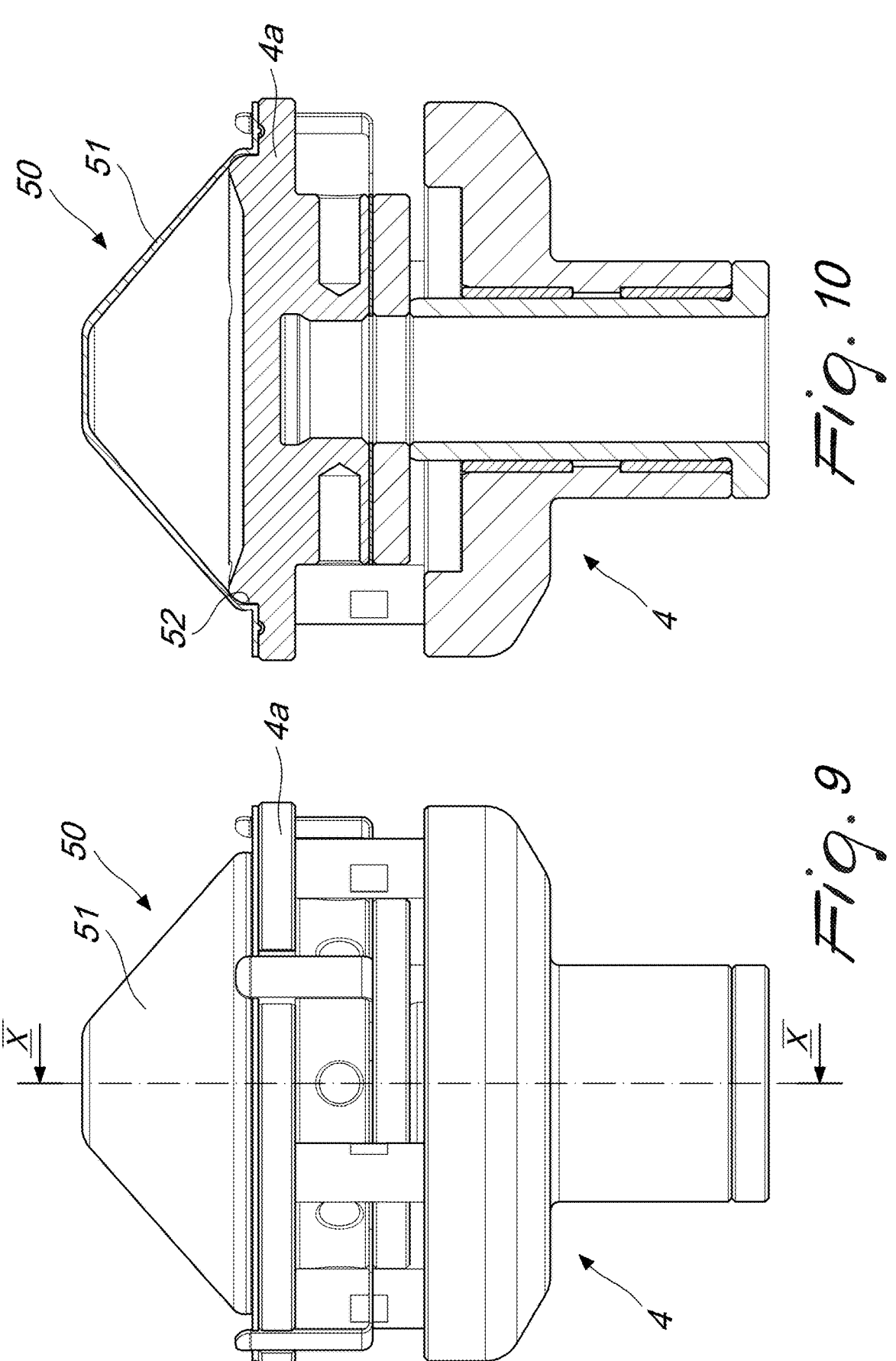
FIG. 9 is a side view of the supporting element.
FIG. 10 is a cross-sectional view of the supporting element taken along the plane of arrangement identified by the line X-X in FIG. 9.

The apparatus for handling preforms in plastic, generally designated by the reference numeral 1, comprises a feeding line 10 for preforms 50 that comprise a preform body 51 and a preform mouth 52.

The feeding line 10 is arranged upstream of a conditioning oven 2 for the preforms 50.

The apparatus comprises a setdown device 20 for the preforms 50, which is located downstream of the conditioning oven 2 and is designed to feed the preforms 50 to a transfer or blow-molding carousel (not shown in the figures).

The conditioning oven 2 is associated with a closed conveyance circuit 3, which comprises a plurality of supporting elements 4 which are configured to support respective preforms 50.

According to the disclosure, the feeding line 10 is provided with a feeding device 10 designed to feed the preforms 50, the respective mouths 52 of which are directed downward, to respective supporting elements 4, and the setdown device 20 comprises at least one overturning element 21 which is adapted to pick up the preforms 50, the respective mouths 52 of which are directed downward, and to move them in order to bring them to a pickup condition with the respective mouths 52 directed upward.

The setdown device 20 further comprises a pickup device 40 designed to pick up the preforms 50 in the pickup condition from the overturning element 21 in order to feed them to the blow molding carousel.

In more detail, the apparatus 1 comprises a plurality of supporting elements 4, which can move, along the respective movement trajectory 102, between a feeding region 200 defined at the feeding line 10 upstream of the conditioning oven 2, and a release region 201 arranged downstream of the conditioning oven 2.

Advantageously, the supporting element 4 comprises a supporting body 4a configured to define a resting element for the rim of the preform mouth 52.

According to an embodiment, the feeding region and the release region are defined along the peripheral region of a carousel 60 that can rotate about the axis 100 of the carousel 60.

Figure 11:
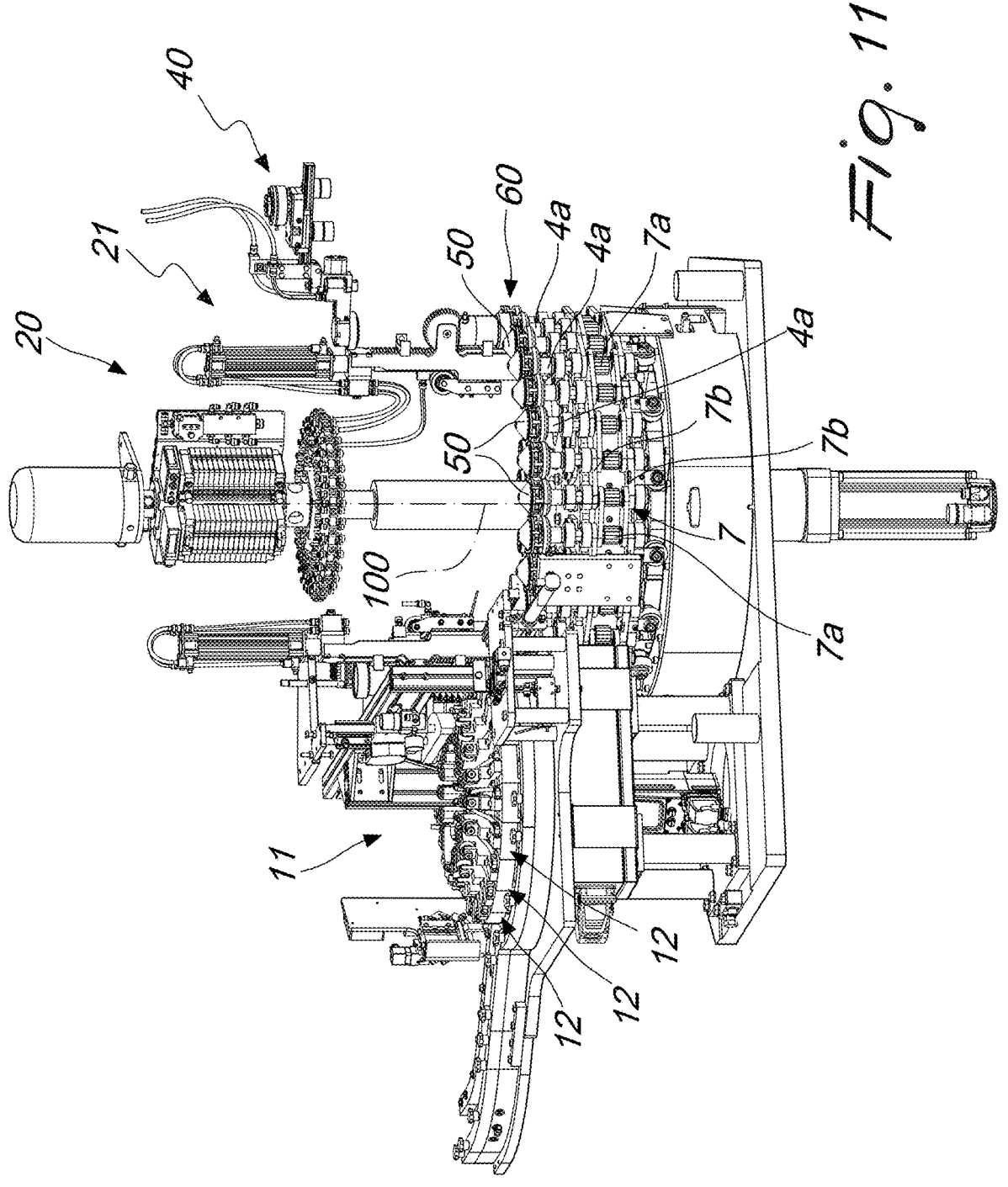
FIG. 11 is a schematic view of the apparatus according to the disclosure with the overturning element in the pickup condition.
Figure 12:
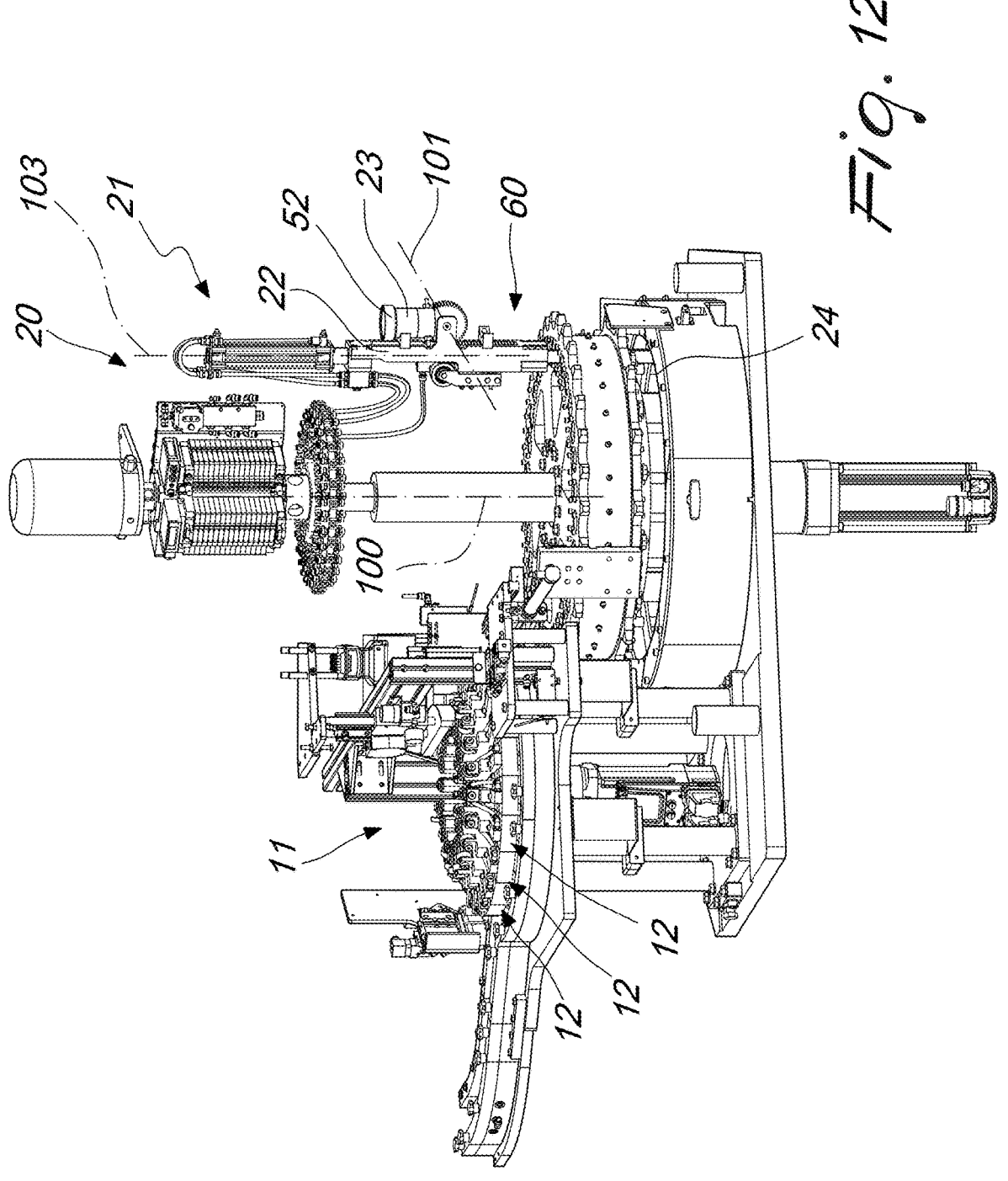
FIG. 12 is a schematic view of the apparatus according to the disclosure with the overturning element in the setdown condition.

The carousel 60 supports, specifically, a plurality of overturning elements 21 which rotate integrally with the carousel 60 and are adapted to pass on command, as a consequence of the rotation about the axis 100 of the carousel, between a position for coupling (shown in FIG. 11) with a respective preform 50 supported by a respective supporting element 4, and a release position (shown in FIG. 12), in which the preform 50 is supported directly by the overturning element 21 with the preform mouth 52 directed upward.

For the purposes of example, the overturning element 21 comprises a base structure 22 which supports, so that it can rotate about a respective articulation axis 101, which is substantially horizontal during use, a grip body 23 which defines an engagement body.

For example, the engagement body is defined by a beaker-like structure which is shaped to accommodate the body 51 of the preform.

Obviously, there is no reason why the grip body cannot be configured differently, for example as a clamp.

The overturning element 21 is provided with a movement roller 24, which is operatively associated with a cam runway which extends about the axis 100 of the carousel 60 and can move along a movement axis 103; the engagement body 23 is connected kinematically to the movement roller so that the movement of the movement roller 24 along the movement axis 103 can cyclically determine the rotation thereby of the engagement body 23 about the articulation axis 101, between the coupling position (shown in FIG. 11) and the release position (shown in FIG. 11) and vice versa.

Specifically, the movement roller 23 can be integral, in its movement along the movement axis 103, with a section of rack that meshes with a pinion that rotates integrally with the engagement body 23.

Obviously, there can be also different means of overturning the engagement body from the coupling position to the release position. By way of example, such movement can be determined by a pneumatic piston connected directly to the section of rack.

Conveniently, the supporting body 4a, during its movement along the closed conveyance circuit 3, is kept at a fixed height.

In this regard, the upper portion of the supporting body 4a is arranged at a lower level with respect to the level of arrangement of the preform mouth 52 at the feeding region 200.

The feeding device 11 comprises, for example, a feeding star conveyor, which defines, at the peripheral region, a plurality of accommodation seats 11a for a respective preform 50.

The preforms 50 are conveyed to the feeding device 11 with the preform mouth 52 of each preform directed downward.

With reference to the embodiment shown in particular in FIGS. 3 to 8, the feeding star conveyor comprises a plurality of radial sectors 12 which are angularly spaced apart about the axis of the feeding star conveyor.

Each radial sector 12 defines a respective accommodation seat 11a.

The accommodation seats 11a comprise a respective recessed region in which the concavity is directed downward and is designed to accommodate, at least partially, a respective preform 50 with its mouth 52 directed downward.

Each accommodation seat 11a is connected to suction means configured to hold, on command, the preform 50 so that it adheres to the respective accommodation seat 11a.

In more detail, the radial sectors 12 have a supporting block 11b which can move along a substantially vertical direction, in contrast with the action of a spring 11d, by virtue of a roller 11c which engages a cam-like profile during the rotation of the feeding star conveyor about its own axis.

The suction means comprise for example a suction duct, not shown, which is connected by way of a connector 11f to a suction port which ends at the top part of each accommodation seat 11a.

At the feeding region 200, the feeding star conveyor is configured to allow the transfer of the preforms 50 from the accommodation seat 11a to a respective supporting body 4a.

The accommodation seats 11a are spaced apart with a pitch that corresponds to the distance between the supporting bodies 4a to which the preforms 50 are to be transferred.

According to an embodiment, the supporting elements 4 are supported by a chain 7 extending along the closed conveyance circuit 3.

The chain 7 comprises a plurality of pins 7a which are interconnected by way of respective links 7b: the supporting elements 4 comprise respective supporting mandrels or bodies which are arranged coaxially to respective pins 7a of the chain.

The supporting mandrels are associated with movement means which are adapted to allow the rotation thereof about its own axis, at least when passing through the conditioning oven 2.

The preforms 50 are, in particular, of the type that have a preform body 51 with a transverse dimension smaller than the preform mouth 52.

Obviously, the height extension of the preforms 50 can also be greater than their diameter.

Advantageously, the preforms 50 are conical or frustum-shaped.

The operation of the apparatus 1 according to the disclosure is the following.

The preforms 50 are fed, by way of the feeding line 10, with the mouth 52 directed downward, to a closed conveyance circuit 3 at the feeding region 200.

From the feeding line 10, the preforms 50 are deposited on a respective supporting body 4a which can move along the conveyance circuit 3 so as to bring the respective preform to pass through the conditioning oven 2.

On exiting from the oven 2, the supporting bodies 4a bring the preforms 50, still supported so that their mouths 52 are directed downward, to the pick-up region 201, where the overturning device 21 proceeds to pick them up from the respective supporting body 4a in order to bring them to a pickup condition with the respective mouths 52 directed upward.

At this point, the pickup device, which is constituted for example by an articulated arm provided at its free end with grip means, picks up the preform 50 from the overturning element 21 in order to feed it to the blow molding carousel.

In practice it has been found that the disclosure fully achieves the intended aim and objects by providing an apparatus for blow molding containers that makes it possible to feed preforms of different diameters and shapes, since it does not need, among other things, to engage the external surface of the preform.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. An apparatus for handling plastic preforms, comprising a feeding line for preforms that comprise a preform body and a preform mouth, said feeding line being arranged upstream of a conditioning oven for said preforms, a setdown device for said preforms being provided which is located downstream of said conditioning oven and is designed to feed said preforms to a transfer or blow-molding carousel, said conditioning oven being associated with a closed conveyance circuit which comprises a plurality of supporting elements which are configured to support respective preforms, said feeding line being provided with a feeding device designed to feed said preforms, the respective mouths of which are directed downward, to respective supporting elements, wherein said setdown device comprises an overturning element which is adapted to pick up said preforms, the respective mouths of which are directed downward, and to move said preforms in order to bring the preforms to a pickup condition in which the respective mouths are directed upward, said setdown device further comprising a pickup device designed to pick up said preforms in said pickup condition from said overturning element in order to feed the preforms to said transfer or blow molding carousel.

2. The apparatus according to claim 1, further comprising a plurality of supporting elements which are configured to move, along a respective movement trajectory, between a feeding region defined at said feeding line upstream of said conditioning oven, and a release region arranged downstream of said conditioning oven.

3. The apparatus according to claim 1, wherein said supporting elements comprises a supporting body configured to define a resting element for a rim of the preform mouth.

4. The apparatus according to claim 2, wherein said feeding region and said release region are defined along a peripheral region of a carousel which can rotate about a carousel axis, said carousel supporting a plurality of overturning elements which rotate integrally with said carousel and are adapted to pass on command, as a consequence of a rotation about the axis of the carousel, between a position for coupling to a respective preform supported by a respective supporting element, and a release position, in which said preform is supported directly by said overturning element with the preform mouth directed upward.

5. The apparatus according to claim 4, wherein overturning element comprises a base structure which supports, so that it can rotate about a respective articulation axis which is substantially horizontal during use, a grip body which defines an engagement seat for a preform.

6. The apparatus according to claim 3, wherein said supporting body, during a movement thereof along said closed conveyance circuit, is kept at a fixed height.

7. The apparatus according to claim 2, wherein an upper portion of said supporting body is arranged at a lower level with respect to a level of arrangement of the preform mouth at said feeding region.

8. The apparatus according to claim 1, wherein said feeding device comprises a feeding star conveyor which defines, at a peripheral region, a plurality of accommodation seats for a respective preform, at said feeding region, said feeding star conveyor being configured to allow a passage of said preforms from said accommodation seat toward a respective supporting body.

9. The apparatus according to claim 8, wherein said feeding star conveyor comprises a plurality of radial sectors which are angularly spaced apart around an axis of said feeding star conveyor, each radial sector defining a respective accommodation seat which comprises a respective recessed region in which a concavity is directed downward and is designed to accommodate, at least partially, a respective preform with a mouth thereof directed downward.

10. The apparatus according to claim 9, wherein said accommodation seat is connected to suction means configured to hold, on command, the preform so that the preform adheres to the respective accommodation seat.

11. The apparatus according to claim 10, wherein said radial sector comprises a supporting block which is configured to move along a substantially vertical direction, in contrast with an action of a spring, by virtue of a roller which engages a cam profile during a rotation of said feeding star conveyor about an axis thereof, said suction means comprising a suction duct which is connected to a suction port which ends at a top part of said accommodation seat.

12. The apparatus according to claim 1, wherein said supporting elements are supported by a chain which extends along said closed conveyance circuit, said chain comprising a plurality of pins which are interconnected by means of respective links, said supporting elements comprising respective supporting mandrels or bodies which are arranged coaxially to respective pins of said chain.

* * * * *